United States Patent Office 3,256,084
Patented June 14, 1966

3,256,084
CARBAMOYL DISULFIDES IN FUNGICIDAL AND HERBICIDAL METHODS
Engelbert Kühle, Cologne-Stammheim, Erich Klauke, Cologne-Flittard, Paul-Ernst Frohberger, Burscheid, Bezirk Dusseldorf, and Ferdinand Grewe, Cologne-Stammheim, Germany, assignors to Farbenfabriken Bayer Aktiengesellschaft, Leverkusen, Germany, a German corporation
No Drawing. Filed Apr. 2, 1963, Ser. No. 269,858
Claims priority, application Germany, Apr. 10, 1962,
F 36,517
14 Claims. (Cl. 71—2.7)

The present invention relates to known carbamoyl disulfides which show remarkable fungicidal activity and can also be used to destroy water plants.

Carbamoyl disulfides have already repeatedly been described in the literature without data as to their applicability. For their production, according to the disclosures of Am. Soc. 82, p. 155 (1960), and 82, p. 5106 (1960), three different routes are possible, which are listed in the following general scheme:

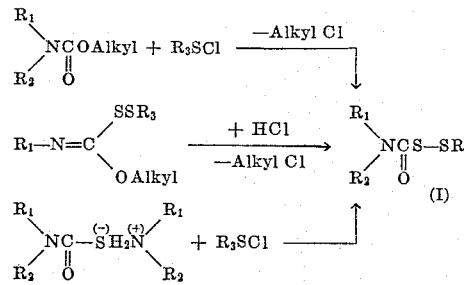

It has been found that the known carbamoyl disulfides of the following formula which is also mentioned above

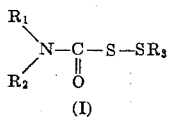

(I)

in which $R_1$ and $R_2$ stand for hydrogen and for alkyl, alkenyl, cycloalkyl and aryl which radicals may be substituted by halogen or a further carbamoyl disulfide group,
$R_1$ and $R_2$ taken together with the nitrogen atom stand for a heterocyclic radical with 5 to 6 ring members, and
$R_3$ stands for alkyl and aryl which radicals may be substituted by halogen and nitro groups, possess a high fungicidal activity and can also be used to destroy plants growing in water.

In the above mentioned Formula I of the products according to the invention $R_1$ and $R_2$ preferably stand for hydrogen, alkyl groups with 1 to 4 carbon atoms, alkenyl groups with 1 to 4 carbon atoms, cycloalkyl groups with 5 to 6 carbon atoms and phenyl. These groups can be substituted by halogen and a further carbamoyl disulfide group. $R_1$ and $R_2$ taken together with the nitrogen atom preferably stand for pyrrolidine and morpholine radicals. $R_3$ preferably stands for alkyl with 1 to 4 carbon atoms and phenyl. These radicals can be further substituted by halogen and the nitro group.

Suitable compounds which can be employed as plant protection agents are e.g. carbamoyl-trichloromethyldisulfide, N - methylcarbamoyl-fluorodichloromethyldisulfide, N,N - dimethylcarbamoyl - fluorodichloromethyldisulfide, N-allylcarbamoyl - fluorodichloromethyldisulfide, N-phenylcarbamoyl-bromofluorochloromethyldisulfide, N - (2,4-dichlorophenyl) - trifluoromethyldisulfide, N - methylcarbamoyl - phenyldisulfide, N,N - dimethylcarbamoyl-(2-nitrophenyl) - disulfide and N,N - tetramethylene-biscarbamoyl-(trichloromethyldisulfide).

The carbamoyl disulfides to be used according to the present invention are well tolerated by plants, and possess a wide range of activity against phytopathogenic organisms.

They are especially suitable for combating soil fungi, which attack subterranean plant organs or plant parts near the soil surface, preparations of the active ingredient being preferably applied as soil treating agents, but possibly also as dressing. The carbamoyl disulfides can be formulated to be empolyed alone or in combination with other plant protection agents, cultivation and preparation assistants in the form of solutions, emulsions, suspensions, granules, powders or paste.

The suitability of carbamoyl disulfides for combating plant diseases is shown by the following examples of application which are given for the purpose of illustrating the invention.

The following compounds, which are denoted by I to XI in the examples, were tested.

(I)  $(CH_3)_2N—CO—S—S—CFCl_2$
(II)  $CH_3—NH—CO—S—S—CFCl_2$
(III)  $(CH_3)_2N—CO—S—S—CCl_3$
(IV)  $(CH_3)_2N—CO—S—S—CHCl—CHCl_2$
(V)  $CH_3—NH—CO—S—S—CHCl—CHCl_2$
(VI)

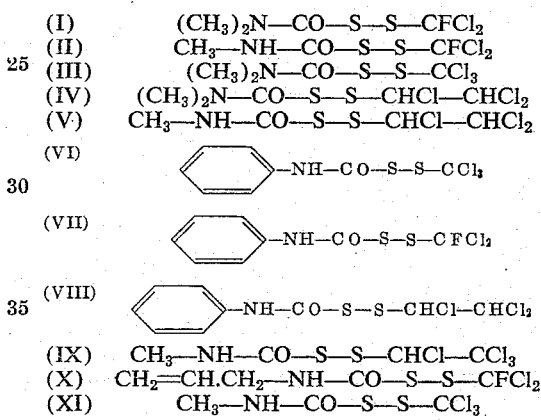

(IX)  $CH_3—NH—CO—S—S—CHCl—CCl_3$
(X)  $CH_2=CH.CH_2—NH—CO—S—S—CFCl_2$
(XI)  $CH_3—NH—CO—S—S—CCl_3$

The following examples are given for the purpose of illustrating the invention.

*Example 1*

(A) When using the preparations as soil treating agents, they were previously extended with talc and quartz sand to a scatterable powder containing 1% of active ingredient. Sterilised Fruhstorf standard earth was inoculated with pure cultures of the phytopathogenic soil fungi *Rhizoctonia solani, Fusarium culmorum, Verticillium albo-atrum* and *Thielaviopsis basicola* and mixed intimately with the above mentioned formulations. Sowing of pea and cotton seeds then took place. In a greenhouse the seeds were allowed to develop under optimum soil moisture and temperatures between 18 and 25% C.

FRUHSTORF STANDARD EARTH, THERMALLY STERILISED

| | | | | |
|---|---|---|---|---|
| Untreated | | 94 | 86 | 90 | 80 |

FRUHSTORF STANDARD EARTH, THERMALLY STERILISED AND INOCULATED

| | | | | |
|---|---|---|---|---|
| Untreated | | 0 | 4 | 0 | 0 |
| I | 5 | 24 | | 90 | |
| | 25 | 40 | | 90 | |
| | 100 | 90 | | 88 | 70 |
| II | 5 | | 14 | | |
| | 25 | | 30 | | |
| | 100 | | 64 | | |

(B) When testing the preparations for their inhibiting action on the mycelium growth of phytopathogenic soil fungi, the preparations were dissolved in acetone at 0.1 and 1% concentrations and in this form added to potato-dextrose-agar liquified by heating, so that the concentration of active agent in the substrate came to 10 and 100 mg./litre. After the substrate-active agent mixture had solidified in Petri dishes, the soil fungi to be tested were inoculated from pure cultures in slices of 5 mm. diameter. After incubation for three days at 20° C. the evaluation of the mycelium growth or its inhibition took place.

The following results were obtained.

| Preparation | Active agent concentration in substrate, ng./litre | Phytopathogenic soil fungi whose mycelium growth was completely stopped by the active agent |
|---|---|---|
| III | 100 | Sclerotium, rolfsii, Sclerotinia sclerotiorum, Thielaviopsis basicola, Phytophthora cactorum, Fusarium culmorum, Fusarium oxysporum, Fusarium solani. |
| IV | 10 | Sclerotium rolfsii, Sclerotinia sclerotiorum, Thielaviopsis basicola, Phytophthora cactorum, Fusarium culmorum. |
| IV | 100 | Sclerotium rolfsii, Sclerotinia sclerotiorum, Thielaviopsis basicola, Phytophthora cactorum, Fusarium culmorum, and Verticillium albo. atrum, Fusarium oxysporum, Fusarium solani. |
| V | 10 | Sclerotium rolfsii. |
| V | 100 | Sclerotium rolfsii, Sclerotinia sclerotiorum, Thielaviopsis basicola, Phytophthora cactorum, Fusarium culmorum, Fusarium oxysporum. |
| VI | 100 | Sclerotium rolfsii, Sclerotinia sclerotiorum, Thielaviopsis basicola, Phytophthora cactorum. |
| VII | 100 | Sclerotium rolfsii, Sclerotinia sclerotiorum, Thielaviopsis basicola, Phytophthora cactorum, Fusarium culmorum. |
| VIII | 100 | Sclerotium rolfsii, Sclerotinia sclerotiorum, Thielaviopsis basicola, Phytophthora cactorum, Fusarium culmorum, Fusarium oxysporum, Fusarium solani. |
| IX | 100 | Sclerotium rolfsii, Sclerotinia sclerotiorum, Thielaviopsis basicola, Phytophthora cactorum, Fusarium culmorum. |

(C) When testing the preparations as seed dressing agents against seed-generated disease germs, wheat was contaminated with 5% spores of wheat rust (*Tilletia tritici*) and applied to the seeds with the preparations in a fine-grained mixture with talc in the usual way as a dry dressing. The contaminated and treated wheat grains were then exposed on moist loam under moist loose compost earth at 10° C. to optimum conditions of germination for the spores. After 10 days the wheat rust spores had taken on untreated wheat seed almost completely at about 50,000 to 75,000 spores/wheat grain and were under the conditions prevailing in practice in a position to infect the wheat seedling. After treatment of the contaminated wheat grains with 300 mg. of active agent per kg. of seeds, a practically complete inhibition of spore germination was achieved with the preparations I, II, III, IV and IX, except for individual spores which occasionally germinated.

*Example 2*

A few representatives of the class of compound according to the invention have shown a high activity as fungicides against *Fusicladium dendriticum* (=*Venturia inaequalis*) and against *Botrytis cinerea*. The activity values and a brief description of the test methods are described in the following. The examination of the fungicidal activity was carried out:

(a) In the spore germination test on condia of *Fusicladium dendriticum*. Solutions or emulsions of the preparations are so mixed with aqueous suspensions of the fungus spores that the preparation concentrations given in the table result. Drops of the mixture are placed on the object carrier and these are incubated in Petri dishes maintained moist in the conditioning cupboard at 20° C. for 24 hours. A microscopic activity determination of the state of germination is then carried out, whereby the germination is evaluated with $O$=100% not germinated, via $III$=50% germinated, to $V$=100% germinated (inactive).

(b) In the leaf test on separated leaves of *Vicia faba* with conidia of *Botrytis cinera*. In a similar way, as described above under (a), preparation-spore mixtures were produced. With these mixtures smill filter paper discs are saturated and these are laid on the leaves of *Vicia faba*. Incubation in Petri dishes as described above under (a).

48 hours after the beginning of the experiment, evaluation takes place, the formation of lesions on the leaves of 0 (=no lesions), via IH (=medium development of lesions) to V (unhibited formation of lesions=inactive) being determined.

The acitivity of the compounds according to the invention is given in the following table.

| Compound | Fusicladium dentr. | | Botrytis cinerea | |
|---|---|---|---|---|
| | 0.0001% | 0.00005% | 0.0001% | 0.00005% |
| I | 0 | 0 | 0 | 0 |
| III | III | IV | I | IV |
| IV | 0 | 0 | 0 | 0 |
| Thiuram (TMTD) | I | III | 0 | III |
| Untreated control | V | V | V | V |

*Example 3*

The compounds according to the invention can also be used for the destruction of plants growing in water. 3 water plants (Elodea, Myriophyllum and Vallisneria) are allowed to grow in aqueous solutions which contain the compounds I and II of the invention. After the period of 3 weeks the degree of destruction is determined. (0 means no effect and 5 means that the plants are completely destroyed)

| Compound | Active agent amount in mg./litre | Degree of destruction | | |
|---|---|---|---|---|
| | | Elodea | Mariophyllum | Vallisneria |
| I | 10 | 5 | 5 | 5 |
| | 5 | 5 | 5 | 5 |
| | 2,5 | 3 | 5 | 4-5 |
| II | 50 | 5 | 5 | 5 |
| | 10 | 5 | 5 | 5 |
| | 5 | 4 | 5 | 5 |
| (Ethylendipyridyliumdi-bromide) | 5 | 3-4 | 1-2 | 1 |

We claim:

1. A method for controlling fungal infection of soil, plants and seeds comprising applying to the same an effective amount of a compound of the formula

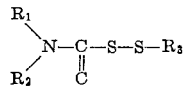

wherein $R_1$ is a member selected from the group consisting of alkyl of 1–4 carbon atoms, phenyl, and allyl; $R_2$ is a member selected from the group consisting of hydrogen and alkyl of 1–4 carbon atoms; and $R_3$ is a member selected from the group consisting of monofluoro-dichloromethane, trichloromethane, dichloromethane, 1-chloro-2,2-dichloroethane, 1-chloro-2,2,2-trichloroethane and bromo-fluoro-chloromethane.

2. A method for controlling fungal infection of soil, plants, and seeds comprising applying to the same an effective amount of a compound having the formula

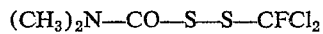

3. A method for controlling fungal infection of soil, plants, and seeds comprising applying to the same an effective amount of a compound having the formula

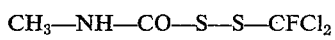

4. A method for controlling fungal infection of soil, plants, and seeds comprising applying to the same an effective amount of a compound having the formula $$(CH_3)_2N-CO-S-S-CCl_3$$

5. A method for controlling fungal infection of soil, plants, and seeds comprising applying to the same an effective amount of a compound having the formula $$(CH_3)_2N-CO-S-S-CHCl-CHCl_2$$

6. A method for controlling fungal infection of soil, plants, and seeds comprising applying to the same an effective amount of a compound having the formula $$CH_3-NH-CO-S-S-CHCl-CHCl_2$$

7. A method for controlling fungal infection of soil, plants, and seeds comprising applying to the same an effective amount of a compound having the formula

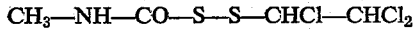

8. A method for controlling fungal infection of soil, plants, and seeds comprising applying to the same an effective amount of a compound having the formula

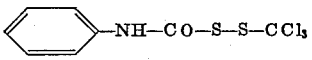

9. A method for controlling fungal infection of soil, plants, and seeds comprising applying to the same an effective amount of a compound having the formula

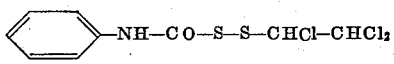

10. A method for controlling fungal infection of soil, plants, and seeds comprising applying to the same an effective amount of a compound having the formula $$CH_3-NH-CO-S-S-CHCl-CCl_3$$

11. A method for controlling fungal infection of soil, plants, and seeds comprising applying to the same an effective amount of a compound having the formula $$CH_2=CH \cdot CH_2-NH-CO-S-S-CFCl_2$$

12. A method for controlling fungal infection of soil, plants, and seeds comprising applying to the same an effective amount of a compound having the formula $$CH_3-NH-CO-S-S-CCl_3$$

13. Method for controlling plant growth in water comprising adding to said water an effective amount of a composition containing, as active ingredient, a compound having the formula $$(CH_3)_2N-CO-S-S-CFCl_2$$

14. Method for controlling plant growth in water comprising adding to said water an effective amount of a composition containing, as active ingredient, a compound having the formula $$CH_3-NH-CO-S-S-CFCl_2$$

References Cited by the Examiner

UNITED STATES PATENTS

| | | | |
|---|---|---|---|
| 2,390,713 | 12/1945 | Hunt | 167—33 XR |
| 2,553,777 | 5/1951 | Hawley et al. | 167—30 XR |
| 2,784,227 | 3/1957 | Klopping | 167—22 XR |
| 2,792,394 | 5/1957 | Himel et al. | 167—22 XR |
| 2,941,879 | 6/1960 | Goodhue | 71—2.7 |
| 3,066,021 | 11/1962 | Beaver et al. | 71—2.6 |

OTHER REFERENCES

Journal of American Chemical Society, vol. 82, pp. 155–158 and 5106–5107 (1960)

JULIAN S. LEVITT, *Primary Examiner*.